UNITED STATES PATENT OFFICE.

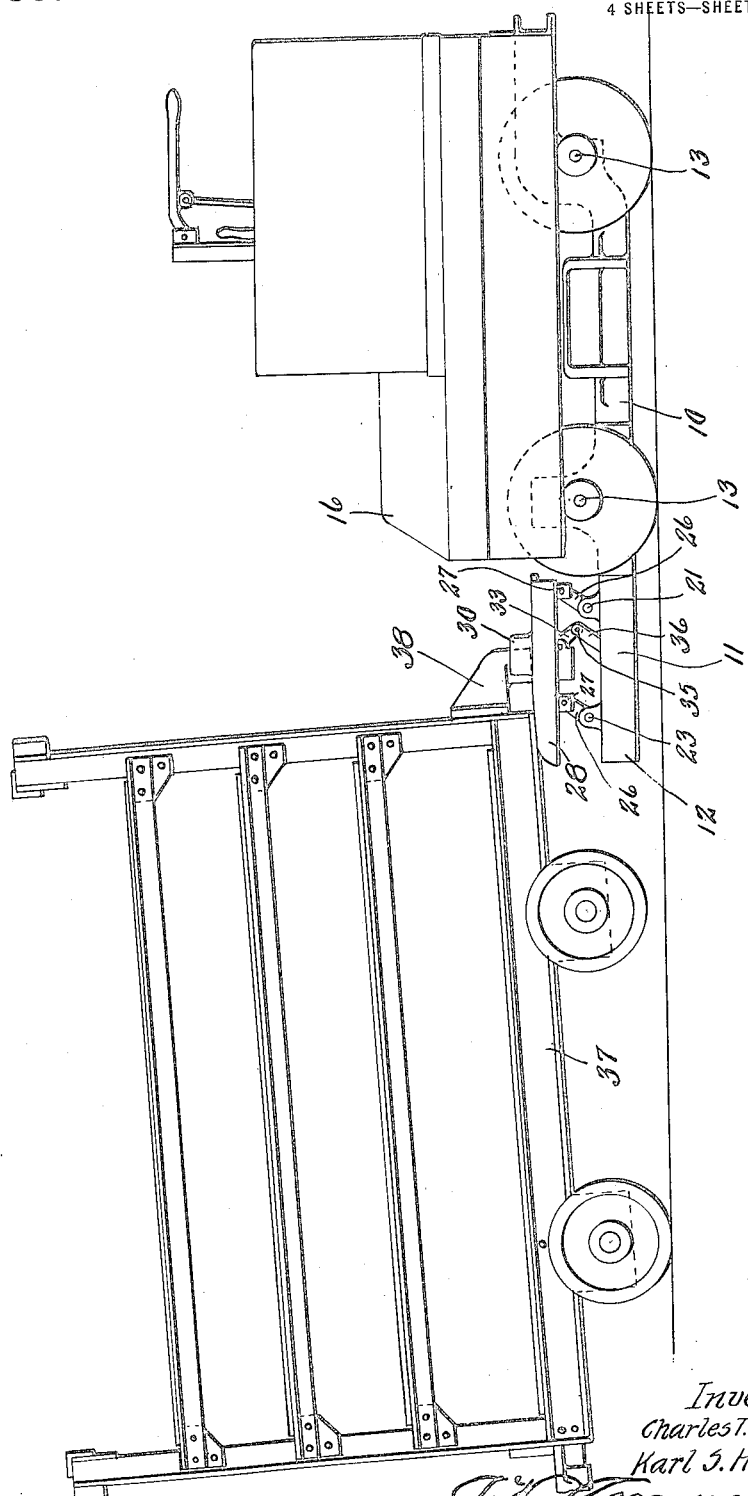

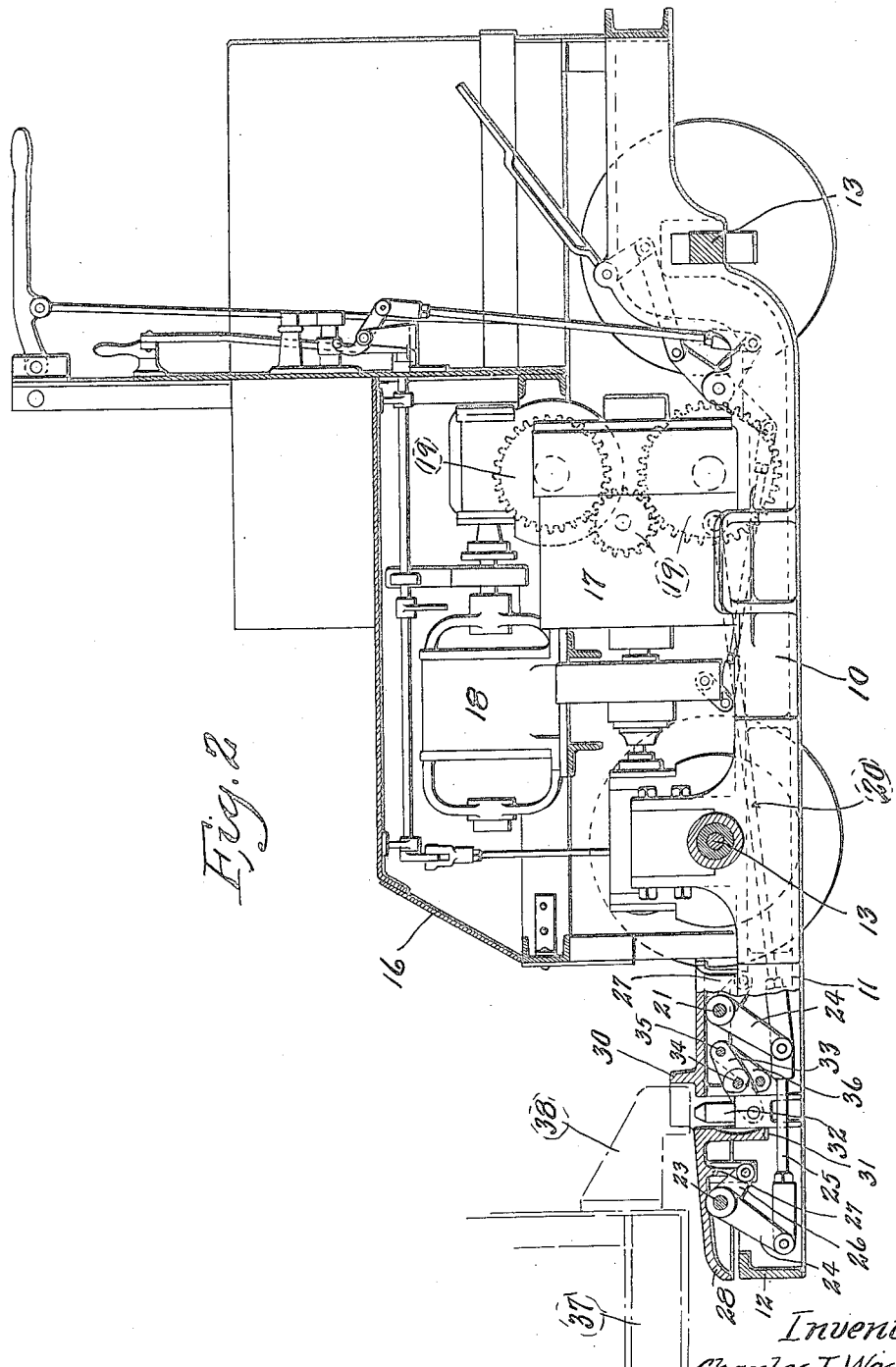

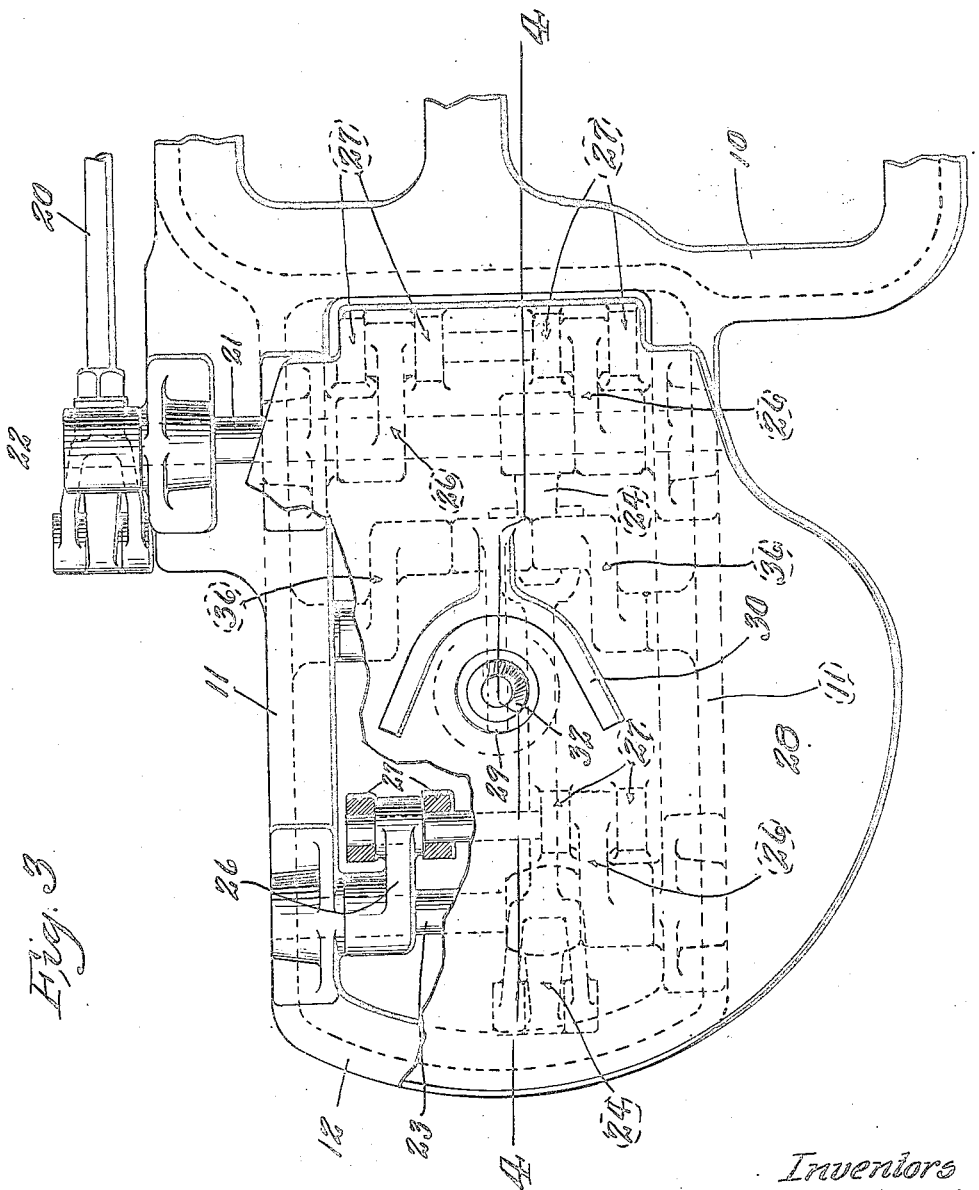

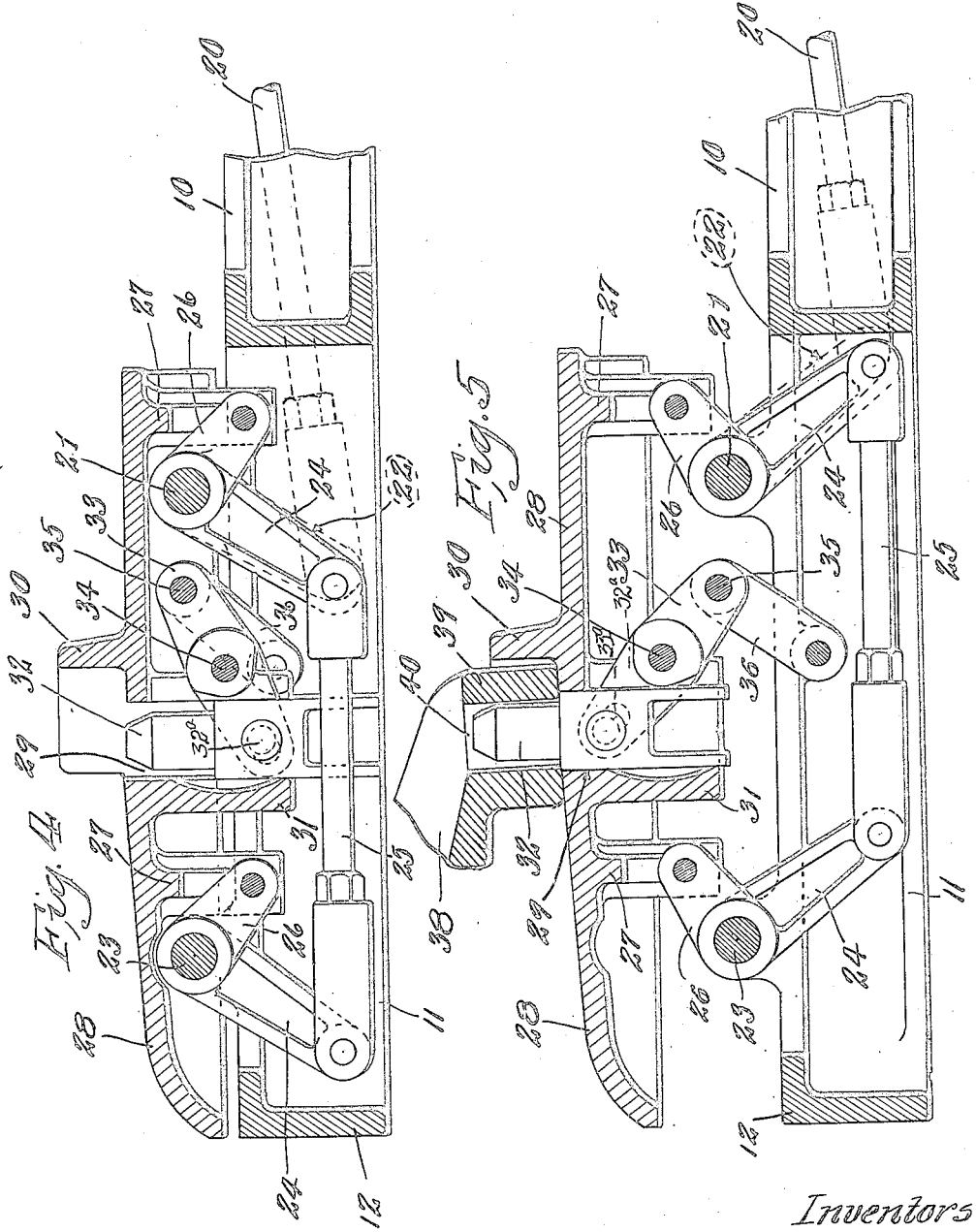

CHARLES T. WESTLAKE AND KARL S. HOWARD, OF ST. LOUIS, MISSOURI.

ELECTRIC TRUCK.

1,424,788.	Specification of Letters Patent.	Patented Aug. 8, 1922.

Application filed December 8, 1919. Serial No. 343,212.

*To all whom it may concern:*

Be it known that we, CHARLES T. WESTLAKE and KARL S. HOWARD, citizens of the United States, residing at St. Louis, Missouri, have invented a certain new and useful Improvement in Electric Trucks, of which the following is a full, clear, and exact description, such as will enable others skilled in the art to which it appertains to make and use the same, reference being had to the accompanying drawings, forming part of this specification.

Our invention relates generally to motor vehicles, and more specifically to a tractor that is particularly designed for use in connection with a load carrying vehicle or trailer, the principal object of our invention being to provide a relatively simple, easily operated and efficient connection between the tractor and trailer, such connection being designed to simultaneously lift one end of the load carrying vehicle or trailer, and couple the lifted end of said trailer to the tractor.

It is common practice to utilize lifting tractors which raise the entire trailer truck from the floor or ground, but in these types of tractors, the efficiency or load carrying capacity is limited for, obviously, they can only haul the loads that they are capable of lifting.

Other types of tractors lift only one end of the trailer truck, such tractors being capable of hauling much greater loads than they are capable of lifting, for it will be understood that where one end of the trailer is lifted, half of the load of said trailer is carried by the wheels of the trailer that are contacting with the floor or pavement. Our improved tractor is of this last mentioned type and it is one of the objects of our invention to provide the tractor with a relatively simple trailer truck lifting and engaging means, the coupling element being vertically disposed so that the trailer is pivoted to the tractor, thereby providing a unit that is movable in all respects and capable of rounding any reasonable curve.

Our invention contemplates the provision of a lifting member, preferably a small platform, arranged on one end of the frame of the tractor and actuated by suitable power driven means, said platform being provided with a vertically movable coupling pin that is adapted to engage a part of the trailer truck, said coupling pin being operated by suitable means so that it is elevated simultaneously with the upward or lifting movement of the platform so that the lifting and coupling operations are accomplished at the same time.

Inasmuch as the lifting platform projects a substantial distance from the main frame of the tractor and the coupling member in said frame cooperates with a bracket that projects from the end of the load carrying trailer, it is possible to effect the lifting and coupling operations while the tractor is positioned at any angle within an arc extending from ninety to one hundred degrees in both directions laterally from the axis of the trailer.

With the foregoing and other objects in view, our invention consists in certain novel features of construction and arrangement of parts, hereinafter more fully described and claimed, and illustrated in the accompanying drawings, in which—

Figure 1 is an elevational view of a tractor of our improved construction and showing the same coupled to the lifted end of a trailer or load hauling truck.

Figure 2 is an elevational view of our improved tractor with parts thereof in vertical section.

Figure 3 is an enlarged plan view of the lifting platform of the tractor with parts thereof broken away and in section.

Figure 4 is a sectional view taken approximately on the line 4—4 of Figure 3 and showing the lifting platform and coupling pin in their lowered positions.

Figure 5 is a sectional view similar to Figure 4 and showing the lifting platform and coupling pin in their elevated positions.

Referring by numerals to the accompanying drawings, 10 designates the frame of our improved tractor which may be of any desired construction, though preferably cast in a single piece, and formed integral with or fixed to one end of this frame is an auxiliary or extension frame comprising a pair of substantially parallel side members 11, the outer ends thereof being connected by a transverse member 12. This auxiliary or extension frame provides a support for the bearings for the trailer lifting mechanism.

The frame 10 is provided with suitable bearings for wheel carrying axles 13 and positioned upon and arranged above said frame is a suitable housing 16 that encloses the greater portion of the operating parts of the tractor. Conveniently mounted on the frame 10 is a storage battery that supplies current to an electric motor 17, the latter having suitable driving connections to one of the wheel carrying axles 13, and said battery also supplies current to a second electric motor 18, the latter being utilized for actuating the trailer lifting platform. This motor 18 drives a train of gearing 19 and to one of the gears in said train is connected one end of a rod 20 that extends through the main frame 10 to the auxiliary frame 11.

Journaled in suitable bearings on the side rails 11 of the auxiliary frame is a shaft 21 and fixed thereupon is a depending crank arm 22 to the lower end of which the forward end of rod 20 is pivotally connected. Journaled in suitable bearings on the forward portions of the side rails 11 of the auxiliary frame is a shaft 23 and depending therefrom and from shaft 21 are crank arms 24 that are arranged parallel with each other and their lower ends being connected by a rod 25.

Fixed on the shafts 21 and 23 are pairs of relatively short crank arms 26, the same being disposed substantially at right angles to the crank arms 24 and said crank arms 26 have pin and slot connections with short vertically disposed legs 27 that depend from the underside of a trailer lifting platform or plate 28. This platform which overlies the auxiliary framework comprising the parts 11 and 12 is preferably formed in a single piece and is provided with a centrally arranged aperture 29.

Formed integral with or fixed to the platform immediately to the rear of this aperture 29 is a substantially U-shaped upstanding flange 30, the space within which constitutes a pocket that is adapted to be occupied by a part of the load carrying trailer, hereinafter described.

Formed integral with or fixed to the platform 28 and around the opening 29 therein is a depending housing 31 in which is arranged for sliding movement a coupling pin 32, and pivotally connected to that portion of the pin that is positioned below the platform is the slotted end of a lever 33 that is fulcrumed on a short transversely disposed pin 34 the ends of the latter being arranged in suitable bearings on the depending housing 31. The end of the lever 33 opposite to the end that is pivotally connected to the coupling pin is pivotally mounted on a transversely disposed shaft or rod 35, the latter being journaled in the upper ends of a pair of links 36, the lower ends of the latter being pivotally connected in any suitable manner to the side rails 11 of the auxiliary frame. A pin 32ª carried by coupling pin 32 engages a slot 33ª in lever 33 so that the operation of lever 33 causes coupling pin 32 to move vertically in housing 31.

Projecting from one end of the frame 37 of the load carrying trailer that is adapted to be lifted and hauled by our improved tractor is a bracket 38, the outer end 39 of which is adapted to occupy the pocket within flange 30 and said outer end being provided with a vertically disposed aperture 40 that is adapted to receive the upper portion of coupling pin 32.

In the use of our improved tractor, the operator by manipulation of the proper control parts drives said tractor toward the loaded trailer until the outer lower end of the bracket 38 on the frame of said trailer is positioned in the pocket within flange 30 of the lifting platform 28, and which latter it will be understood is in its lowermost position as illustrated in Figures 2 and 4.

Motor 18 under control of the operator is now actuated to drive the train of gearing 19 and as such action takes place, rod 20 will be drawn forwardly and through crank arm 22, shaft 21 will be rocked and this rocking movement will be transmitted to shaft 23 through crank arms 24 and connecting rod 25. Following this simultaneous rocking movement imparted to shafts 21 and 23, crank arms 26 swinging upwardly will elevate the platform 28 and the latter engaging the underside of bracket 38 will elevate the same and the adjacent end of the trailer truck, consequently lifting the adjacent trailer truck wheels off the floor or ground, as illustrated in Figure 1. As this lifting movement is effected, shaft 34 which forms a fulcrum for lever 33 will be elevated and as such action takes place, said lever will shift its position by reason of the fact that its outer end is pivotally connected to shaft 35 and the latter is connected to links 36, the lower ends of which are pivotally connected to the auxiliary frame of the tractor. Such action will cause the end of the lever 33 that is pivotally connected to coupling pin 32 to move upwardly with the result that the coupling pin will be elevated through the housing 31 and the opening 29 in elevating platform 28 so that when said platform has been elevated to the desired degree, the upper portion of the coupling pin will be positioned in the aperture 40 in the end of bracket 38, thereby effectually coupling the trailer truck to the tractor. (See Figs. 1 and 5). Obviously a reverse movement of the motor 18 will bring about a reversal of movement of the parts as just described and the lifting platform will move downward to its limit of movement and simultaneously the coupling pin 32 will be retracted or drawn downward out of engagement with the bracket on the end of the trailer.

In order to provide sufficient clearance between the elevating platform of the tractor and the projecting bracket of the trailer, the rear upper surface of the platform is sloped gradually downward toward its outer edge. If the tractor were backed up to the trailer, and the latter lifted without being coupled, the trailer would be liable to slide down the inclined surface of the lifting platform and prevent proper coupling. To overcome this possibility it is desirable that the trailer be coupled in some manner to the tractor before the latter is lifted and our invention accomplishes this desired result.

In the operation of our improved truck it will be noted that when the lifting platform is positioned below the bracket on the trailer there is a certain amount of vertical clearance between the bracket and the platform and the latter must travel upwardly through this clearance or space before beginning to lift the trailer. Our improved construction utilizes this travel of the platform to raise the coupler pin a sufficient distance above the upper surface of the platform to effect the coupling operation before the trailer is absolutely engaged and lifted. This action is accomplished by arranging the parts which actuate the coupling pin so that the latter has a more rapid initial movement than the platform so that while the lifting and coupling operations may be said to occur simultaneously, the coupling operation is, as a matter of fact, effected just prior to and during the first portion of the trailer lifting action.

A lifting and coupling mechanism of our improved construction is comparatively simple, is positive in action, is capable of being readily controlled by the operator of the tractor, and is very effective in performing its intended functions.

It will be readily understood that minor changes in the size, form and construction of the various parts of our improved lifting and coupling mechanism can be made and substituted for those herein shown and described, without departing from the spirit of our invention, the scope of which is set forth in the appended claims.

We claim:

1. The combination with a tractor and a trailer, of an elevating member carried by said tractor and adapted to engage and raise one end of said trailer, coupling means operatively mounted in said elevating member and the connections between said coupling means and said tractor adapted to impart a differential operating movement to said coupling means relative to said elevating member.

2. The combination with a tractor and a trailer, of an elevating member mounted on said tractor and adapted to raise one end of said trailer, coupling means movably mounted in said elevating member and a member pivotally mounted on said elevating member and having operative engagement with said coupling means, said arm having operative connections with said tractor whereby the actuation of said elevating member will cause a coupling movement of said coupling means.

3. The combination with a tractor and a trailer, of an elevating member operatively mounted on said tractor and adapted to raise one end of said trailer, coupling means operatively mounted in said elevating member, a member pivotally mounted on said elevating member and having operative engagement with said coupling means and means connecting said pivotal member with the tractor whereby said coupling means is actuated by the movement of said elevating member.

4. The combination with a tractor, of a vertically movable platform arranged on said tractor, a vertically movable coupling member arranged in said platform for differential movement relative to said platform, means for operating said platform, and means for actuating said coupling member.

5. The combination with a tractor having and extension frame, of a vertically movable platform positioned above said extension frame, a coupling member arranged to move through said platform, means for elevating said platform, and means for automatically elevating said coupling member when said platform is actuated.

6. The combination with a tractor having an extension frame, of a vertically movable platform positioned above said extension frame, a coupling member arranged to move vertically through said platform into an engaging position and means for elevating said platform and coupling member at different speeds relative to each other.

7. The combination with a tractor, of a vertically movable platform arranged on said tractor, the top of said platform being provided with a pocket, and a coupling pin arranged to move upwardly through the platform into said pocket at differential speed relative to said platform.

8. The combination with a tractor, of a vertically movable platform arranged on said tractor, the top of said platform being provided with a pocket, a coupling member arranged to move upwardly through the platform into said pocket, and means for differentially elevating said platform and coupling member.

9. The combination with a trailer, of a tractor provided with trailer engaging and lifting means, coupling means mounted in said lifting means and movable outwardly therethrough into a coupling position and operative connections between said coupling means and said tractor and adapted to impart to said coupling means a movement which is differential with respect to said lifting means.

10. The combination with a tractor and a trailer, of operable means on the tractor for simultaneously lifting one end of the trailer, and operating coupling means, said coupling means being mounted for vertical movement in said operable means, the coupling being completed in advance of the completion of the lifting.

11. The combination with a tractor of a trailer lifting member, means mounted on said tractor and supporting said lifting member in position, means for operating said supporting means, whereby said lifting member is moved into a lifting position, a coupling member movable through said lifting member into an engaging position, and a lever mounted on said lifting member and connected to said coupling member, said lever having operative connection with said tractor whereby said coupling member is actuated during the movement of the lifting member.

12. The combination with a tractor, of a lifting member, arms pivotally mounted on said tractor, and having their free ends pivotally connected to said lifting member, means for actuating said arms whereby said lifting member is moved relative to said tractor, a coupling member slidably mounted in said lifting member, and operative connections between said coupling member and said tractor, whereby said coupling member is moved in the same direction in which the lifting member is operated but at a different rate of speed.

13. The combination with a tractor and a trailer, of lifting means mounted for vertical movement on the tractor, coupling means mounted in said lifting means and movable therethrough, and operable means mounted on said lifting means and having operative connections with said coupling means and said tractor for operating said coupling means when said lifting means is actuated.

14. The combination with a tractor, of a plurality of arms pivotally mounted on said tractor, a trailer lifting member supported on the free ends of said arms, means for actuating said arms, a coupling member slidably mounted in said lifting member and movable in the same direction in which said lifting member is operated, a lever pivotally mounted on said lifting member and operatively connected at one end to said coupling member, and means for operatively connecting the opposite end of said lever with said tractor.

In testimony whereof we hereunto affix our signatures this 25th day of November, 1919.

CHARLES T. WESTLAKE.
KARL S. HOWARD.